United States Patent [19]

Whyzmuzis

[11] Patent Number: 4,722,963

[45] Date of Patent: Feb. 2, 1988

[54] AROMATIC DICARBOXYLIC ACID POLYAMIDE HAVING ACID VALUE GREATER THAN 35

[75] Inventor: Paul D. Whyzmuzis, Plymouth, Minn.

[73] Assignee: Henkel Corporation, Ambler, Pa.

[21] Appl. No.: 811,209

[22] Filed: Dec. 20, 1985

[51] Int. Cl.$^4$ ............................................. C08G 69/26
[52] U.S. Cl. .................................. 524/606; 524/607; 528/332; 528/335; 528/339; 528/339.3; 528/339.5; 528/345; 528/347
[58] Field of Search .............. 528/347, 345, 332, 335, 528/339, 339.3, 339.5; 524/606, 607

[56] References Cited

U.S. PATENT DOCUMENTS 3,397,816  8/1968  Ess et al. ........................... 528/339.3
3,616,176  10/1971  Jachimowicz ....................... 428/211
3,786,007  1/1974  Whyzmuzis et al. ................ 528/339

FOREIGN PATENT DOCUMENTS 60838  4/1975  Australia .

Primary Examiner—Harold D. Anderson
Attorney, Agent, or Firm—Ernest G. Szoke; Henry E. Millson, Jr.

[57] ABSTRACT

Polyamide resins are prepared from aromatic dicarboxylic acids and which are substantially free of dimeric or higher polymeric fat acids. The resins generally have improved alkaline water solubility or dispersibility having substantially lower solution viscosities than prior polyamide resins. The harder resins with their water solubility find particular utility as ink binders. The softer resins find utility as a film layer bonding two flexible substrates.

16 Claims, No Drawings

AROMATIC DICARBOXYLIC ACID POLYAMIDE HAVING ACID VALUE GREATER THAN 35

FIELD OF THE INVENTION

This invention relates to polyamide resins prepared from aromatic dicarboxylic acids and which are substantially free of dimeric or higher polymeric fat acids. The resins generally have improved alkaline water solubility or dispersibility having substantially lower solution viscosities than prior polyamide resins. The harder resins with their water solubility find particular utility as ink binders. The softer resins find utility as a film layer bonding two flexible substrates.

BACKGROUND OF THE INVENTION

Flexographic inks are solvent based inks applied by rollers or pads to flexible sheets or rolls of plastic foil and paper. The practical aspects of the use of these ink resins, and inks derived therefrom, require that the polyamide resin be soluble in alcoholic solvents and such solubility be obtained without sacrificing toughness, adhesion and gloss.

Environmental concern over the amounts of volatile organic solvents in the atmosphere has led to a desire to use aqueous solutions that have less volatile organic solvents contained therein. In order to accommodate the reduced levels of volatile organic solvents, the polyamide resins used as binders should have increased water solubility and yet retain the other desirable properties of polyamide resins such as those based on the polymeric fatty acids.

U.S. Pat. Nos. 3,253,940 and 3,224,893 illustrate the polyamide resins of polymeric fatty acids used in the past in formulations utilizing alcoholic solvents particularly ethanol in which varnishes of the polyamides in alcohol solvents were on the order of 35% by weight nonvolatile solids.

The foregoing patents provided resins which could be employed with the usual alcoholic solvents. However, as environmental solutions were sought, efforts were made to reduce emissions such as those from the volatile alcohol solvents. One means of reducing the emission was to provide water-reducible polymeric fatty acid polyamides as illustrated in U.S. Pat. No. 3,776,865. As disclosed therein, this was achieved by acid termination of the polymeric fatty acid polyamides employing an acid component of the polymeric fatty acid and another codicarboxylic acid and an amine component comprising isophorone diamine alone or in admixture with conventional diamines such as the alkylene diamines i.e., ethylene diamine. Acid termination was achieved by employing about 50–75 amine equivalents per 100 carboxyl equivalents. Varnishes of these resins in an alcohol solvent such as n-propanol on the order of about 40% non-volatile solids are disclosed.

Another U.S. patent, U.S. Pat. No. Re. 28,533 dealing with polymeric fatty acid polyamides employing lower aliphatic mono-basic acids such as acetic and propionic with certain amine combinations disclosed a few solubilities in ethanol up to 60% though many were 50% or below.

As environmental standards have become more and more stringent, effort have continued to provide resins which comply with such standards. High solids varnishes on the order of 55–60%, and preferably above 60%, which are formulated into pigmented inks will meet the solvent emissions standards desired in order to reduce solvent emissions. U.S. Pat. No. 4,508,868 discloses polyamides prepared from polymeric fatty acids and diamines which include in the acid component an unsaturated fatty acid monomer and which employ relative amine and carboxyl amounts so as to provide an acid terminated product having an acid value in the range of 8–20 and preferably in the range of 10–15. Such products could be employed in alcoholic ink varnishes at levels of 60% solids or higher.

However, the polyamide resins from polymeric fatty acids, while providing acceptable properties in most instances, do not possess the desired water solubility or dispersibility when employed in inks or varnishes. Accordingly attempts have been made to improve the hardness and water solubility products which contain even lower volatile organic solvents. Commonly assigned co-pending application Ser. No. 701,903 filed Feb. 15, 1985 by Whyzmuzis, et al, now abandoned, was an attempt to overcome the deficiencies of the polymeric fatty acid polyamide resins. This patent application discloses polyamides which are substantially free from polymeric fatty acids which have improved water solubility in their use with flexographic or gravure ink binders. While such resins provided generally acceptable products, there was still room for improvement in the hardness or non-tacky properties of the resins.

SUMMARY OF THE INVENTION

It has now been found that further improved polyamide resins substantially free from polymeric fatty acids and useful as flexographic/gravure ink binders are provided by employing an aromatic dicarboxylic acid in the acid component. The use of the aromatic dicarboxylic acids provide resins having improved hardness or non-tacky properties while retaining the advantageous properties of the earlier resins such as those of U.S. Pat. No. 4,508,868 or U.S. patent application Ser. No. 701,903, noted above. Thus, the present invention provides resin compositions formed from a mixture of X equivalent percent of an acid component and Z equivalent percent of an amine component wherein the acid component is comprised of an aromatic dicarboxylic acid alone or in a mixture with an aliphatic dicarboxylic acid having from 2-25 carbon atoms, and said amine component is comprised of a diamine alone, a monoalkanol amine alone or mixtures of diamine and monoalkanol amine and the ratio of Z:X is less than 1 to provide a polyamide having an acid value greater than about 35. The preferred polyamides are those wherein the ratio of Z:X is less than about 0.9, more preferably ranges from 0.50 to about 0.85, and most preferably from about 0.65 to about 0.85.

In addition to providing the foregoing polyamide resins, this invention also provides binder compositions such as flexographic/gravure ink compositions containing such resins and aqueous solvents and ink pigments. In addition to the use in flexographic/gravure ink compositions, the polyamide resins of this invention also find utility in coating compositions where harder, non-tacky coatings are desired particularly where it is desirable to apply such coatings from aqueous solvent solutions having low solution viscosities, with or without pigments. Further, the softer resins may be employed when it is desirable to bond two flexible substrates where adhesion to each is desirable.

DETAILED DESCRIPTION OF THE INVENTION

The polyamide resins of the present invention are prepared by polymerizing a mixture of the amine component and the acid component. The resins are acid terminated resins in that an excess of dicarboxylic acids are used in relation to the amine component reactants. If a monobasic acid is desired to be used as a chain-stopper, such should be employed in limited, or very small amounts (less than 10, and preferably less than 5 equivalent percent), as their presence can adversely affect the properties of the polyamide resin. The ratio of equivalents of the amine component to the equivalents of acid component is less than 1, preferably less than about 0.9, more preferably ranges from 0.50 to about 0.85, and most preferably about 0.65 to 0.85. In considering the equivalents of the amine component, it is necessary to take into consideration the hydroxyl group of the alkanolamine which is also reactive with the carboxyl groups of the acid component and which results in a polyester-amide, i.e. a polyamide also containing ester groups. Accordingly, where reference is made to the equivalents of the amine component, it is understood that both the hydroxyl and amine equivalents of the amine component are considered.

As indicated earlier in the polyamide resins of this invention, an aromatic dicarboxylic acid is employed either alone or in admixture with copolymerizing aliphatic dicarboxylic acids. In general, the aromatic dicarboxylic acid which are employed will contain from 8-16 carbon atoms. Such acids include phthalic, isophthalic, and terephthalic, and diphenic and naphtalene dicarboxylic acids, isophthalic and terephthalic being the preferred acids.

The aliphatic dicarboxylic acids which may be employed along with the aromatic diacid are those having from 2-25 carbon atoms with the longer-chain acids, i.e., from 13 and above, with the 16-21 carbon atom acids being the most desirable. The dicarboxylic acids include not only the straight-chain aliphatic acids, but also include those having branched alkyl chains and alicyclic structures in the molecule as well. Accordingly, the dicarboxylic acids include the usual shorter-chain acids beginning with ethanedioic and the usual aliphatic dicarboxylic acids such as azelaic, adipic and sebacic acid. The class also includes longer-chain dicarboxylic acids such as heptadecane dicarboxylic acid (a $C_{19}$ acid) and acids obtained by the Diels-Alder reaction products of acrylic acid with a fatty acid having conjugated ethylenic unsaturation such as 2-n-hexyl-5-(7-carboxyl-n-heptyl)-cyclohex-3-ene (a $C_{21}$ diacid) carboxylic acid which is available from Westvaco, Charleston Heights, SC as Westvaco diacid. Heptadecane dicarboxylic acids are well known and prepared via the known process of carboxylation of oleic acid. References to these acids are made in U.S. Pat. No. 3,781,234 which in turn makes reference to German Pat. No. 1,006,849 for the preparation of the 1,8- or 1,9-heptadecane dicarboxylic acid.

As indicated, the aromatic dicarboxylic acid is employed alone or in a mixture with the aliphatic dicarboxylic acids. Where employed, the aliphatic dicarboxylic acid may be employed in an amount up to about 50 equivalent percent of the acid component, or a ratio of equivalents of aromatic to aliphatic dicarboxylic acid of 1:1. Stated another way, the acid component may accordingly be comprised of (a) 50-100 equivalent percent of the aromatic dicarboxylic acid and (b) 0-50 equivalent percent of the aliphatic dicarboxylic acid.

As earlier noted, the polyamides of this invention are prepared from mixtures that are substantially free of polymeric fatty acids. These polymeric fatty acids, which can be characterized as long-chain polybasic acids, are described in U.S. Pat. No. 3,776,865 and U.S. Pat. No. 3,157,681. These polymeric fatty acids are derived by polymerizing unsaturated fatty acids. If necesary to modify the resins of the present invention, such polymeric fatty acids may be used in very small amounts, i.e. up to about 5 equivalent percent. Preferably no polymeric fat acid should be employed.

The diamines used to form the polyamide resins of this invention may be aromatic or aliphatic, cyclic and heterocyclic. Preferably, the amine component contains at least one aliphatic diamine having 2-25 aliphatic carbon atoms or an akanolamine such as discussed below. The preferred diamines can be divided into various preferred groups, mixtures of which may be employed. In the aromatic or heterocyclic group amines such as piperazine and xylylene diamine may be employed. In the cycloaliphatic group, cyclic aliphatic diamines having from 8-12 aliphatic carbon atoms, e.g., isophorone diamine may be employed. Another preferred group is comprised of short-chain alkylene diamines which can be represented by the formula: $H_2N-R-NH_2$, wherein R is an alkylene radical having from 2-8 carbon atoms. R may be branched or straight-chain, the straight-chain radicals being preferred. Specific examples of short-chain alkylene diamines are ethylene diamine, diaminopropane, diaminobutane, and hexamethylene diamine. Another group is the short chain polyether diamines which are commercially available, which may be defined by the formula:

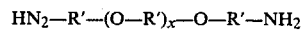

$$HN_2-R'-(O-R')_x-O-R'-NH_2$$

where R' is an alkylene group containing 2-6 carbon atoms, preferably an ethylene or isopropylene group and x is an integer of 0-5, preferably 1 or 2, such that an average molecular weight not more than about 400 and preferably less than about 250. Commercially available polyether diamines are Jeffamine D-230 and 400 described by the supplier as polyoxypropylene diamine.

The monoalkanolamines which may be employed alone or in admixture with the aromatic, aliphatic or heterocyclic diamines in this invention are those containing 2-6 carbon atoms, straight or branched-chain, which may be represented by the formula: $OH-R''-NH_2$ wherein R'' is an alkylene radical having from 2-6 carbon atoms. Specific examples of short-chain monoalkanolamines are ethanolamine, propanolamine, and butanolamine, with the ethanol and propanolamine products being preferred.

The resins are prepared from mixtures of a dicarboxylic acid component and an amine component by known methods for the polymerization of diacids and diamines to form polyamides. In general, a mixture of the diacid component and the amine component is heated to a temperature of between 100°-250° C. in a vessel equipped for the removal of the by-product water formed in the amidification reaction; e.g., a vessel fitted with a distillation column and condenser so as to remove water from the reaction zone.

Typically, the reaction mixture will be heated at lower temperatures initially to avoid any volatilization and loss of any reactant which may be employed, after which the temperature is raised to a higher reaction temperature. Thus, it is common to heat at a temperature of about 140° C. for about 1 hour followed by raising the temperature to about 210°-250° C. and reacting for 1.0-3.0 hours, preferably with the last hour under vacuum.

The degree of polymerization of the mixture is controlled, along with a choice of ratio of amine:acid, to provide a polyamide having a high acid value. The acid value of the polyamide should be greater than about 35, more preferably greater than 50, i.e. between 50 to about 250, dependent on the particular amine and acid formulation.

The polyamide resins of this invention form the binder compositions of this invention when dissolved in an aqueous solvent containing ammonia or an organic amine. The resin is added to the solvent in an amount of about 30-40% resin solids based on the weight of the solvent. Examples of suitable organic amines include primary, secondary, and tertiary amines which can act as a base to salt the acid terminated polyamides. Particularly preferred organic amines are the dialkyl aminoalkanols such as 2-(N,N-dimethylamino)ethanol and 2-(N,N-diethylamino)ethanol.

The organic amine is present in the aqueous solution in an amount sufficient to solubilize the chosen polyamide resin. In general, the organic amine will be present in the aqueous solution in an amount sufficient to theoretically neutralize the acid groups of the polyamide, i.e., the amount of organic amine is stoichiometrically equivalent to or greater than the acid value of the polyamide. For example, a 7.4% solution of dimethylaminoethanol is stoichiometrically equivalent to a polyamide resin having an acid value of about 70 used at a level of about 40% resin solids. A large excess of organic amine should be avoided because retention of the organic amine in the cured binder may adversely affect the water resistance of the binder.

These binders are particulaly useful in flexographic/gravure ink compositions. The resins may also be useful in other coating compositions where harder, non-tacky products are desired or in the cases of softer, somewhat tacky products, in bonding two flexible substrates where adhesion to each substrate is desirable. Where employed in ink compositions, the inks are prepared by dispersing a flexographic/gravure ink pigment in the binder compositions of the invention.

The invention can be further illustrated by the following nonlimiting examples in which all parts and percentages are by weight, unless otherwise noted. In the examples there are shown polyamides of the present invention generally denoted by arabic numbers and comparative examples are generally denoted by a letter.

Further, in the examples the terms, abbreviations and symbols have the following meanings:
IPA: Isophthalic Acid (1,3)
PA: Propionic Acid
EDA: Ethylene Diamine
D-230: Jeffamine D-230—Polypropylene Diamine available from Texaco Chemical Company having molecular weight about 230
D-400: Jeffamine D400—Polypropylene Diamine having molecular weight of about 400
$C_{21}$: Westvaco $C_{21}$ Diacid—2-m-hexyl-5-(7-carboxyl-n-heptyl)-cyclohexo-3-ene carboxylic acid
MEA: Monoethanolamine
HMDA: Hexamethylene Diamine
T.Av.: Theoretical Acid Value
Act.Av.: Actual Acid Value
Am.V.: Amine Value
OH V.: Hydroxyl value
SP°C.: Softening Point °c. (Ball & Ring)
P.S.: Physical State
Sol.: Solubility
C3M-30: Solvent Composition 75.2/15.9/5.8/3.1-$H_2O$/n-proponol/Dimethylethanol Amine/$NH_4OH$
P.E.Wet: 30% Solid Varnish (Resin plus Solvent) wets out polyethylene
$H_2O$ Tack: Resin alone develops tack with $H_2O$ immersion
$H_2O$ Resist: Films of dried varnish on polyethylene subjected to 100 $H_2O$ rubs with finger after 30 minute exposure
Disp.: Stable dispersion Typical Resin Preparation The resins described in the examples summarized in the following Table I were prepared by charging the acid and amine reactants shown in Table I to a reactor along with about 1% of an 85% solution of phosphoric acid as a catalyst. The reaction mixture was heated to 210° to 250° C. and held for 1 to 2.5 hours at that temperature. The resulting resin has the properties as shown in Table II, Comparative Example A, which has a Gardner Holdt solution viscosity of H-I, illustrates a composition such as found in application Ser. No. 701,903.

Examples 1-17 illustrate resins of this invention which are soluble in aqueous solutions and which find utility in ink varnishes. Each of these solutions are very low solution viscosity products having a solution viscosity on the order of water alone, i.e. Gardner Holdt of $AA_1$. Examples 16 and 17 which are tacky are resins which could be applied out of aqueous solutions but which may be better suited for application where their tackiness is advantageous, i.e. in bonding two flexible substrates where adhesion to each is desired.

TABLE I

| Example | IPA | $C_{21}$ | PA | EDA | MEA | HMDA | D-230 | D-400 |
|---|---|---|---|---|---|---|---|---|
| A | — | 75 | 25 | 81 | — | — | — | — |
| 1 | 100 | — | — | 41.7 | 41.6 | — | — | — |
| 2 | 100 | — | — | — | 83.3 | — | — | — |
| 3 | 100 | — | — | — | 91.6 | — | — | — |
| 4 | 75 | 25 | — | 77 | — | — | — | — |
| 5 | 65 | 35 | — | 74.5 | — | — | — | — |
| 6 | 50 | 50 | — | 70.7 | — | — | — | — |
| 7 | 75 | 25 | — | — | 77 | — | — | — |
| 8 | 87.5 | 12.5 | — | — | 80.2 | — | — | — |
| 9 | 100 | — | — | — | 61.8 | 20.6 | — | — |
| 10 | 100 | — | — | 44.2 | — | — | — | 29.5 |
| 11 | 100 | — | — | 51.5 | — | — | — | 34.3 |

TABLE I-continued

| Example | IPA | C21 | Equivalents of Reactants PA | EDA | MEA | HMDA | D-230 | D-400 |
|---|---|---|---|---|---|---|---|---|
| 12 | 100 | — | — | — | — | — | 70.7 | — |
| 13 | 100 | — | — | — | — | — | 88.5 | — |
| 14 | 100 | — | — | 35.8 | — | — | — | 35.7 |
| 15 | 100 | — | — | 42.3 | — | — | — | 42.3 |
| 16 | 100 | — | — | 16.7 | — | — | — | 50.1 |
| 17 | 100 | — | — | 20.4 | — | — | — | 61.0 |

The physical properties of the resulting resin and evaluation of the resin, particularly in varnish solutons, for suitability as an ink resin can be seen from the following Table II.

TABLE II

| Example | T.Av. | Act.Av. | Am.V | OHV | SP °C. | P.S. | Sol C3M-30 | PE Wet | H2O Tack | H2O Resist |
|---|---|---|---|---|---|---|---|---|---|---|
| A | 50 | 52 | — | — | 91 | Sl | H-I | yes | no | OK |
| 1 | 100 | 200.0 | 29.4 | 55.6 | 169 | Hard | Disp. | no | no | — |
| 2 | 100 | 182.3 | 19.7 | 5 | 154 | Brittle | Disp. | yes | no | — |
| 3 | 50 | 138.4 | 20.4 | 6.2 | 157 | Brittle | Disp. | no | no | — |
| 4 | 100 | 118.1 | 14.0 | — | 142 | Brittle | Disp. | yes | no | OK |
| 5 | 100 | 124.6 | 10.3 | — | 130 | Brittle | Disp. | yes | no | OK |
| 6 | 100 | 118.0 | 11.0 | — | 115 | Brittle | yes | yes | no | OK |
| 7 | 100 | 151.8 | 8.4 | 18.6 | 111 | Brittle | yes | yes | no | OK |
| 8 | 100 | 162.9 | 11.3 | 20.6 | 128 | Brittle | yes | yes | no | OK |
| 9 | 100 | 186.5 | 22.5 | 43.6 | 148 | Hard | yes | no | no | — |
| 10 | 100 | 108.8 | 10.3 | — | 111 | Hard | Disp. | no | yes | — |
| 11 | 50 | 64.4 | 10.7 | — | 115 | Hard | Disp. | no | yes | — |
| 12 | 100 | 105.3 | | — | 103 | Hard | Border | no | Sl | yes |
| 13 | 38.2 | 42.9 | | — | 108 | Hard | Border | no | Sl | yes |
| 14 | 100 | 112.5 | | — | 97 | Sl | yes | no | yes | |
| 15 | 50 | 60.1 | | — | 96 | Sl | yes | yes | yes | Acpt |
| 16 | 100 | 75.5 | 5.6 | — | — | Tacky | yes | yes | yes | Mod. |
| 17 | 50 | 50.7 | 4.3 | — | — | Tacky | yes | yes | yes | Mod. |

Examples 1-17 summarized in Tables I and II illustrate compositions which have low solution viscosity in aqueous solutions. Examples 1-13 are particularly desirable for ink varnishes for flexographic and gravure inks providing hard resins. Examples 14 and 15 while still having slight tack are also useful for ink applications and compared to Example A have improved low solution viscosity.

Another series of resins were prepared and illustrate isophthalic acid based polyamides having a range of properties of from very hard (though not soluble in aqueous alkaline solutions) to semi-solid, semi-liquid or liquid products which find utility in other areas requiring water solubility other than inks or ink varnishes. Such other resins can provide coatings either 100% solids type or formed from the solvent system where such can be tolerated. The compositions and properties thereof can be seen from the following Tables III and IV.

TABLE III

| Example | IPA | Equivalents of Reactants C21 | PA | EDA | D-400 |
|---|---|---|---|---|---|
| 18 | 50* | 25 | 25 | 78.8 | — |
| 19 | 100 | — | — | 83.3 | — |
| 20 | 100 | — | — | 57.8 | 19.2 |
| 21 | 75 | — | 25 | 58.0 | 19.3 |
| 22 | 100 | — | — | — | 70.7 |

*IPA added in two stages

TABLE IV

| | Examples | | | | |
|---|---|---|---|---|---|
| | 18 | 19 | 20 | 21 | 22 |
| T.Av. | 100 | 100 | 100 | 100 | 100 |
| Act.Av. | 154.0 | 84.0 | 151 | — | 63.7 |
| Am.V. | 10.3 | 22.5 | — | — | 1.7 |
| OHV | — | — | — | — | — |
| SP °C. | 77 | 192 | 129 | 80 | — |
| P.S. | Sint. | V. Hard | Hard | S. Liq. | Liq. |
| Sol. - C3M-30 | no | no | no | — | yes |
| P.E. Wet | — | — | — | — | yes |
| H2O Tack | no | no | mod. | — | yes |
| H2O Resist | — | — | — | — | no |

EXAMPLE 23

Example 8 was repeated except that the time of reaction at 210° C. was 3.5 hours with the last hour being under vacuum (10 mm). Operation under vacuum results in a lowering of the hydroxyl value with other properties being substantially the same. These can be seen from Table V below, in which the values for Example 8 are included for comparison.

| | Example | |
|---|---|---|
| | 23 | 8 |
| SP °C. | 135 | 128 |
| T.Av. | 100 | 100 |
| Act.Av. | 151.3 | 162.9 |
| Am.V. | 12.2 | 11.3 |
| OH.V | 5.0 ± 1.5 | 20.6 |
| Sol. C3M-30 | yes | yes |
| PE Wet | yes | yes |

We claim:
1. A polyamide resin formed from a mixture comprising:
X equivalent percent of an acid component substantially free from a polymeric fat acid comprised of an aromatic dicarboxylic acid and Z equivalent percent of an amine component wherein the ratio of Z to X is less than 1 to provide an acid value greater than 35 and wherein said acid amine component is comprised of an amine selected from the group consisting of a monoalkanolamine and mixtures thereof with a diamine.

2. A polyamide as defined in claim 1 wherein said ratio of z to x is from about 0.50 to about 0.85.

3. A polyamide as defined in claim 1 wherein said acid component is comprised of 50–100 equivalent percent of said aromatic dicarboxylic acid and 0–50 equivalent percent of an aliphatic dicarboxylic acid having from 2–25 carbon atoms.

4. A polyamide as defined in claim 3 wherein said aliphatic dicarboxylic acid has from 16–21 carbon atoms.

5. A polyamide as defined in claim 4 wherein said aliphatic dicarboxylic acid is heptadecanedicarboxylic acid.

6. A polyamide as defined in claim 4 wherein said aliphatic dicarboxylic acid is 2-n-hexyl-5-(7-carboxyl-n-heptyl)cyclohex-3-ene carboxylic acid.

7. A polyamide as defined in claim 3 wherein said aromatic dicarboxylic acid is isophthalic acid.

8. A polyamide as defined in claim 1 wherein said diamine is an aliphatic diamine having from 2–25 carbon atoms.

9. A polyamide as defined in claim 8 wherein said diamine is an alkylene diamine in which the alkylene group contains from 2–8 carbon atoms.

10. A polyamide as defined in claim 8 wherein said diamine is ethylene diamine.

11. A polyamide as defined in claim 8 wherein said diamine is hexamethylene diamine.

12. A polyamide as defined in claim 8 wherein said diamine is a polyether diamine having an average molecular weight not more than about 400.

13. A polyamide as defined in claim 12 wherein said polyether diamine has a molecular weight below 250.

14. A polyamide as defined in claim 1 wherein said monoalkanolamine contains from 2–6 carbon atoms.

15. A polyamide as defined in claim 14 wherein said alkanolamine is ethanolamine.

16. A binder composition which comprises a polyamide resin of claim 1 and an aqueous solvent containing ammonia and an organic amine.

* * * * *